(12) United States Patent
Lin et al.

(10) Patent No.: US 8,365,204 B2
(45) Date of Patent: Jan. 29, 2013

(54) UNIFYING HETEROGENEOUS DIRECTORY SERVICE SYSTEMS

(75) Inventors: Patrick Y. Lin, Westford, MA (US); Duncan L. Mewherter, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 12/477,411

(22) Filed: Jun. 3, 2009

(65) Prior Publication Data

US 2010/0313210 A1    Dec. 9, 2010

(51) Int. Cl.
*G06F 3/00*    (2006.01)
*G06F 9/44*    (2006.01)
*G06F 9/46*    (2006.01)
*G06F 13/00*   (2006.01)

(52) U.S. Cl. ....................................................... 719/328
(58) Field of Classification Search .................... 719/328
See application file for complete search history.

(56) References Cited

U.S. PATENT DOCUMENTS 6,732,172 B1 * 5/2004 House et al. .................. 709/225
2008/0263640 A1 * 10/2008 Brown .............................. 726/5

* cited by examiner

*Primary Examiner* — Andy Ho
*Assistant Examiner* — Timothy A Mudrick
(74) *Attorney, Agent, or Firm* — Patents on Demand P.A.; Brian K. Buchheit; Scott M. Garrett

(57) ABSTRACT

A unification point that federates heterogeneous directory service systems can include an identifier communion table for storing a set of records, each record indexing a unified object ID to a directory object ID and a directory ID. The directory ID can be a unique identifier of a directory service system. The directory object ID can be a unique identifier of a record maintained by the directory service system. The unification point can also include a computer program product for accepting directory service requests including a unified object ID, for using the identifier communion table to look up a corresponding directory object ID and directory ID, for generating a modified directory service requests that substitutes the directory object ID for the unified object ID, for conveying the modified directory service requests to the directory service system, for receiving a response, and for conveying the response to a request issuing entity.

19 Claims, 3 Drawing Sheets

UNIFYING HETEROGENEOUS DIRECTORY SERVICE SYSTEMS

BACKGROUND

The present invention relates to the field of collaborative computing and, more particularly, to unifying heterogeneous directory service systems.

A directory service is a service of a software system that stores, organizes and provides access to information in a directory. Directory services can look-up a uniquely identified individual and information associated with the individual. Unique directory objects often include users, groups, communities, membership, etc. Increasingly, it is desirable to make directory service information maintained in an enterprise system available to computing systems and applications outside the enterprise. This is especially true with many different types of collaboration applications, business to business applications, and social networking applications. Social networking applications, for example, often rely on directory services to provide account information. This practice contributes to a myriad of aspects of the social networking application—from the security to defining peer groupings and social network relationships.

Few integration problems result when a collaboration application (e.g., LOTUS CONNECTIONS) interfaces with a homogenous directory service system. This is especially true when the homogeneous directory service infrastructure based upon a single, popular standard, such as implementing enterprise-wide Lightweight Directory Access Protocol (LDAP) directory services. Unfortunately, enterprises do not necessarily maintain directory services as a homogenous manner. For instance, multiple different LDAP services can be employed to handle user accounts and groupings for corporate applications among different geographical locations, countries, and cultures with different languages. In many corporate infrastructures, different functional or geographic units of the corporation have local control and responsibility for maintaining information technology (IT) resources, which naturally results in non-uniform handling of IT resources including non-uniform handling of directory services.

Further, there is a growing demand from business partners to have machine-to-machine access to portions of an enterprise's computing environment to conduct business-to-business (B2B), business-to-consumer (B2C), and other e-business transactions. Directory services of an enterprise generally do not maintain unified records in their directory service system for business partners (B2B) and/or consumers (B2C) even though this information can be highly relevant to a collaboration application that relies upon directory service obtained information. It is expected that collaboration applications that depend upon directory service information (i.e., to determine unique users, groups, community memberships, etc.) will increasingly have to operate in environments that maintains needed information in a heterogeneous set of directory service systems.

Historical attempts to handle problems associated with heterogeneous directory service systems have been directed to consolidating information maintained by the heterogeneous set of systems into a single "master" directory management system. Often, a consolidation approach fails or requires significant situation unique work-arounds to be implemented, which are costly to establish, test, and maintain. That is, it is often not possible, by nature of directory services, to perform a straight forward consolidation of heterogeneous systems.

To elaborate, collaboration applications typically access directory services via Application Programming Interfaces (APIs). The core of this type of access requires identifying unique directory objects (e.g., users/groups) which can be structured in a manner specific to a particular directory service system. Typically, a canonical format for an object ID present in a directory service system is used to access directory objects. This canonical format can vary from system-to-system in a heterogeneous environment. Further, although all records of a discrete directory service system may be unique (as required), this uniqueness can fail when combined with data of other systems. Attempts to adjust data from different systems when forming a consolidated "master" directory service system, can cause original object identifiers to change. Thus, a canonical format valid in a homogeneous realm can be unrecognized in the federated realm, due to enforced uniqueness constraints, use non-canonical encoded IDs (e.g., proprietary/custom ID schema) within discrete ones of the directory service systems, and other such problems.

SUMMARY

One aspect of the disclosure includes a method for applications to acquire directory service information from a heterogeneous set of directory service systems. A unification point comprising software executing on hardware having an API interface for accepting and conveying directory service messages can be identified. The unification point can receive a plurality of directory service information requests. Information corresponding to the requests can be maintained in a set of different heterogeneous directory service systems. Each request can include a unique identifier specific to the unification point. For each directory service request, the unification point can query an identification communion table to determine a unique identifier for a unique one of the heterogeneous directory service systems that maintains directory service information able to satisfy the directory service request. Additionally, the unification point can generate a directory service request including the determined unique identifier and can convey the generated directory service request to the determined one of the heterogeneous directory service systems via an API specific to that directory service system. The unification point can receive a response from the determined one of the heterogeneous directory service systems via an API specific to that directory service system. The unification point can generate a directory service response and can conveying the generated directory service response to a requesting entity via the unification point API.

Another aspect of the disclosure includes a unification point for federation of heterogeneous directory systems. The unification point can include an identifier communion table for storing a set of records, each record indexing a unified object ID to a directory object ID and a directory ID. The directory ID can be a unique identifier of a directory service system. The directory object ID can be a unique identifier of a record maintained by the directory service system. The unification point can also include a computer program product for accepting directory service requests including a unified object ID, for using the identifier communion table to look up a corresponding directory object ID and directory ID, for generating a modified directory service requests that substitutes the directory object ID for the unified object ID, for conveying the modified directory service requests to the directory service system indicated by the directory ID, for receiving a response from the directory service system, and for conveying the response to request issuing entity.

DETAILED DESCRIPTION

Figure 1:
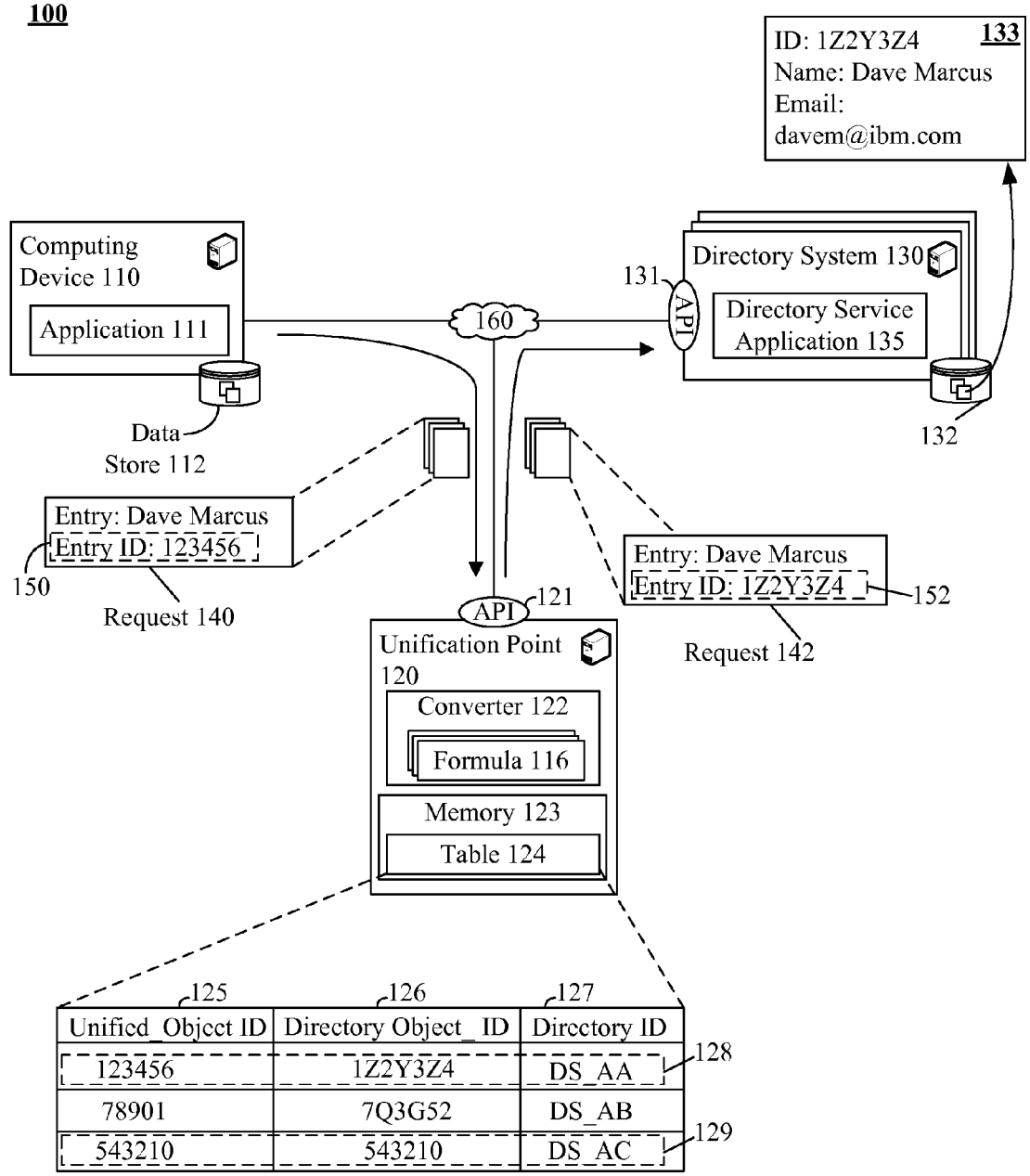
FIG. 1 is a schematic diagram for a system depicting a unification point that utilizes an ID communication table to permit a software application to interact in with heterogeneous directory service applications in accordance with an embodiment of the inventive arrangements disclosed herein.

The disclosure teaches a unification point for directory services, which utilizes an ID communion table, which obviates problems related to heterogeneous directory systems. The ID communication table can be a very light weight data object, which is able to be implemented in a volatile memory at runtime. In one embodiment, the ID communion table does not need to be persisted to disk or other non-volatile memory. Instead, the ID communion table can maintain the most frequently used entries at a given point in time, which means it can be implemented in a very small buffer providing a lightweight on-demand solution. The ID communication table can include a set of indexed records, which relate a unified object ID to a directory object ID and a directory ID. The unification point can also include a set of formulas to maintain relationships between the unified object ID and the directory object ID, where specifics of the formulas can vary based upon directory object ID. The unifying point can provide a reliable bridge to interface between a set of applications and back-end directory repositories. The applications can rely only on a unified object ID, which functions as a unique identifier to a virtual homogeneous directory system (from a perspective of the application, actually implemented using the unification point). The back-end directory repositories can only rely on a directory object ID, which is specific to that back-end system. Conversions between the application and back-end directory repositories occur at the unification point.

More specifically, applications needing information from the heterogeneous directory systems can direct all directory service communications to the unification point and can receive all responses from the unification point. From the perspective of these applications, directory service information is provided from a single homogenous system. Each time the unification point receives a directory service request, it can determine which of two or more directory systems is to handle the request. It can further determine based upon data in the ID communion table, whether a conversion of an identifier used by the application is needed. The unification point can perform any conversion necessary using a set of formulas that maintain relationship between the unified object ID and the directory object ID. The unification point can convey an equivalent request generated to the appropriate heterogeneous directory system, in a format required by that directory system. Responses from each of the heterogeneous systems are conveyed to the unification point, which thereafter performs any conversions of identifiers as needed, after which the response is directed to the application.

It should be appreciated that the unification point itself does not centrally federate the data into a single data store from multiple different data stores. Each data store instead is independently maintained in a format and structure determined by that particular heterogeneous directory system. Thus, problems with data transformation, migration, synchronization, and the like are avoided by using the unification point. Further, one of ordinary skill should be able to appreciate that in absence of use of the ID communion table (believed to be novel for directory services as implemented), there is no straight forward way for applications to exchange data with a heterogeneous set of directory service applications. The ID communion table can be a very light weight vehicle able to be implemented in memory at runtime, which resolves a historically challenging problem.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram for a system 100 depicting a unification point 120 that utilizes an ID communication table 124 to permit a software application 110 to interact in with heterogeneous directory service applications 135 in accordance with an embodiment of the inventive arrangements disclosed herein. In system 100, computing device 110, unification point 120, and a set of directory systems 130 can be communicatively linked via a network 160 over which messages (including requests 140 and 142 and responses to the same) are conveyed.

The unification point 121 can function as a centralized point for handling directory service requests 140 from applications 111 running on a set of computing devices 110. From an application 111 perspective, all service requests 140 are conveyed to the unification point 120, which issues back responses, where the unification point 120 behaves as a homogeneous directory system. That is, requests 140 can be directory request conveyed to a directory service Application Program Interface (API) 121. From a perspective of each of the set of heterogeneous directory systems 130, the unification point 120 conveys standard, properly formatted requests 142, to which each of the systems 130 responds. Each request from the unification point 120 can be directed to an API 131 of a corresponding system 130. Content provided in response to requests 140, 142 can be from data stores 132 associated with the heterogeneous set of directory systems 130.

The unification point 120 can include a converter 122 and an ID communion table 124. The ID communication table 124 can include a set of records providing an index between a unified object identifier 125, and a directory object identifier 126, which is an identifier unique to a specific directory system 130 identified by the directory ID 127. The unified object identifiers 125 can be the same (e.g., record 129) or different (e.g., record 128) from the directory object identifier 126. When different, the converter 122 can execute and can converting content of request 140 from a requesting application 111 to content of a request 142 sent to a directory system 130.

For example, entry ID 150 having a value of "123456" can be converted into entry ID 152 having a value of "IZ2Y3Z4" per record 128. Request 142 can be sent to an API 131 of an appropriate directory system 130 (i.e., DS_AA from record 128), which access an associated record 133 stored in its data store 132 in accordance with operations of the a directory service application 135. The application 135 generates a response from record 133 information. The response can be conveyed back to unification point 120. The unification point 120 reformats the response (e.g., using unified object ID 125 instead of directory object ID 126), which is conveyed back to the requesting computer device 110.

In one embodiment, the converter 122 can include a set of formulas 116. Each formula 116 can be implemented in a computer program product stored in a physical memory that is able to be executed/interpreted by a hardware processor. These formulas 116 can maintain a relationship between a unified object ID 125 and the directory object ID 126, where the relationship and/or formula 125 used is based upon the directory ID 128. The formulas 125 are always available to convert requests and responses back and forth as needed.

In one embodiment, the unification point 120 need not persist data of the ID communion table 124, which can be temporarily maintained in a volatile memory 123 (e.g., RAM), which need not be persisted in all configurations of system 100. In one embodiment, the ID communion table 124 can be implemented in a light weight manner using little memory 123. The converter 122 and unification point 120 can also be very light weight components consuming few computing components when run. Thus, in one embodiment, the unification point 120 can be added to a computing infrastructure (e.g., can even be a functionality added to a router, bridge, or hub, for example) with little additional expense and a minimal impact on system 100 performance. In another embodiment, the unification point 120 can be a software implemented component, such as a component of a J2EE application server environment. The unification point 120 can introduce minimal latency to system 100 due to its lightweight nature. In one configuration, only the most frequently used entries can be present in the ID communion table 124 at any point in time. Entries not included in table 124, which are needed, can be obtained (from a comprehensive database, for example) on demand, at the time requests 140 are received.

Values of table 124 are not limited to most frequently used entries in all embodiments, and other embodiments are contemplated. For instance, other optimization algorithms than those based upon the most frequently used entries can be used to determine which values are to populate the table 124. In one embodiment, values can be temporarily loaded into table 124, rapidly used thereafter, then discarded, such as during an application start-up. Such an implementation does not require the temporarily loaded values to have been frequently used in the recent past and does not consume great quantities of memory, as table values can be purged after application start-up.

To elaborate upon such an embodiment, during application 111 start-up, an information request 140 can be initiated for all directory service data needed by the application 111. This data can be maintained in multiple ones of the data stores 132. The unification point 120 can populate the ID communion table 121 with values. Requests 142 can then be sent to each of the heterogeneous directory systems 130. Responses can be conveyed from each system 130 to point 120 and then to data store 112, where information is maintained for the duration of the application 111 session, as needed. Once responses to requests 140 are provided by the unification point 120, the ID communication table 124 can be discarded and associated memory cleared.

System 100 is not limited in to any of the above specific configurations for populating values of the ID communion table 124. Any of a variety of techniques can be used and still be in scope of system 100. For example, in one contemplated embodiment, ID communication table 124 data can be persisted (i.e., memory 123 can be loaded when unification point 120 is initialized with all data necessary to anticipated requests 140). In one embodiment, a series of one or more swap caches can be used, to maximize a number of entries in an ID communion table, while minimizing a size requirement for memory 123. In one embodiment, an authorized administrator can adjust behavioral patterns of memory 123 to optimize how unification point handles a customized load given resources available to the unification point 120.

Although shown generically in FIG. 1, it should be appreciated that the unified object id 125 and/or the directory object id 126 can be standard or non-standard formats. In one embodiment, for example, each unified object ID 125 can be in a standard/canonical GUID format in compliance with an LDAP standard, such as LDAPv3 as specified by the Internet Engineering Task Force (IETF) Requests for comments (RFCs) as detailed in RFC 4510. Further, the directory object ids 126 can be in a standardized or proprietary format (e.g., raw DominoUNID in byte-string representation used by LOTUS DOMINO; a byte-string representation from an ACTIVE DIRECTORY system stored as binary (Octet) format, etc.). When either ID 125, 126 conforms to an LDAP, the ID value can represent a distinguished Name (DN). Further, the directory ID 127 can be an IP address, a domain name, or other unique identifier for a directory system 130. In one embodiment, formulas 116 can be added to unification point 120 to extend functionality of unification point 120 to handle additional formats.

A canonical format can be a globally unique identification number computed based on one or more inputs by an algorithm. Non-canonical formats can include, but are not limited to, base64 encoding, byte-string representation, and the like. A canonical formatted value and non-canonical formatted value can be different representations of an identical value.

The unification point 120 can handle any format for requests 140, whether proprietary or standardized. Standardized formats for directory services, which are handled by the unification point 120, can include, for example, LDAP, X.500 directory service standards (e.g., Directory Access Protocol (DAP), Directory System Protocol (DSP), Directory Information Shadowing Protocol (DISP), Directory Operational Binding Management Protocol (DOP), etc.), XML Enabled Directory (XED), XML Enabled Directory (XED), Directory Service Markup Language (DSML), Service Provisioning Markup Language (SPML), Service Location Protocol (SLP), and the like.

In one embodiment, the unification point 120 can operate in a fashion transparent to application 111 (which treats the unification point 120 as a homogeneous directory system) and transparent to directory system 130 (which treats the unification point 120 as a standard request issuing client). In one embodiment, communications to and from the communication point 120 can occur at the transport layer of the Open Systems Interconnection Reference Model (OSI Model). These communications can be optionally secured using Simple Authentication and Security Layer (SASL), Transport Layer Security (TLS), Secure Sockets Layer (SSL), and other such techniques.

Network 160 can include any hardware/software/and firmware necessary to convey data encoded within carrier waves. Data can be contained within analog or digital signals and conveyed though data or voice channels. Network 160 can include local components and data pathways necessary for communications to be exchanged among computing device components and between integrated device components and peripheral devices. Network 160 can also include network equipment, such as routers, data lines, hubs, and intermediary servers which together form a data network, such as the Internet. Network 160 can also include circuit-based communication components and mobile communication components, such as telephony switches, modems, cellular communication towers, and the like. Network 160 can include line based and/or wireless communication pathways.

As used herein, presented data stores 112 and 132 can be a physical or virtual storage space configured to store digital information. Data stores 112 and 132 can be physically implemented within any type of hardware including, but not limited to, a magnetic disk, an optical disk, a semiconductor memory, a digitally encoded plastic memory, a holographic memory, or any other recording medium. Data stores 112 and 132 can be a stand-alone storage unit as well as a storage unit formed from a plurality of physical devices. Additionally, information can be stored within data stores 112 and 132 in a variety of manners. For example, information can be stored within a database structure or can be stored within one or more files of a file storage system, where each file may or may not be indexed for information searching purposes. Further, data stores 112 and/or 132 can utilize one or more encryption mechanisms to protect stored information from unauthorized access.

Computing device 110, directory system 130, and unification point 120 can comprise a set of one or more hardware devices, each of which optionally containing software (e.g., an operating system, BIOS, software/firmware computer program products, etc) and/or firmware that the hardware is able to execute to perform computing operations. The hardware can include one or more central processing unit, a volatile memory, and a nonvolatile memory, and a network adaptor (for connecting the hardware to network 160) interconnected via a bus. Computing device 110, directory system 130, and/or unification point 120 can each be implemented as a standalone machine or as a set of two or more machines operating in a distributed computing space as a single computing device. Further, a software application 111, 135 can be an application comprising multiple different components, each of which may be executed upon different computing devices.

Figure 2:
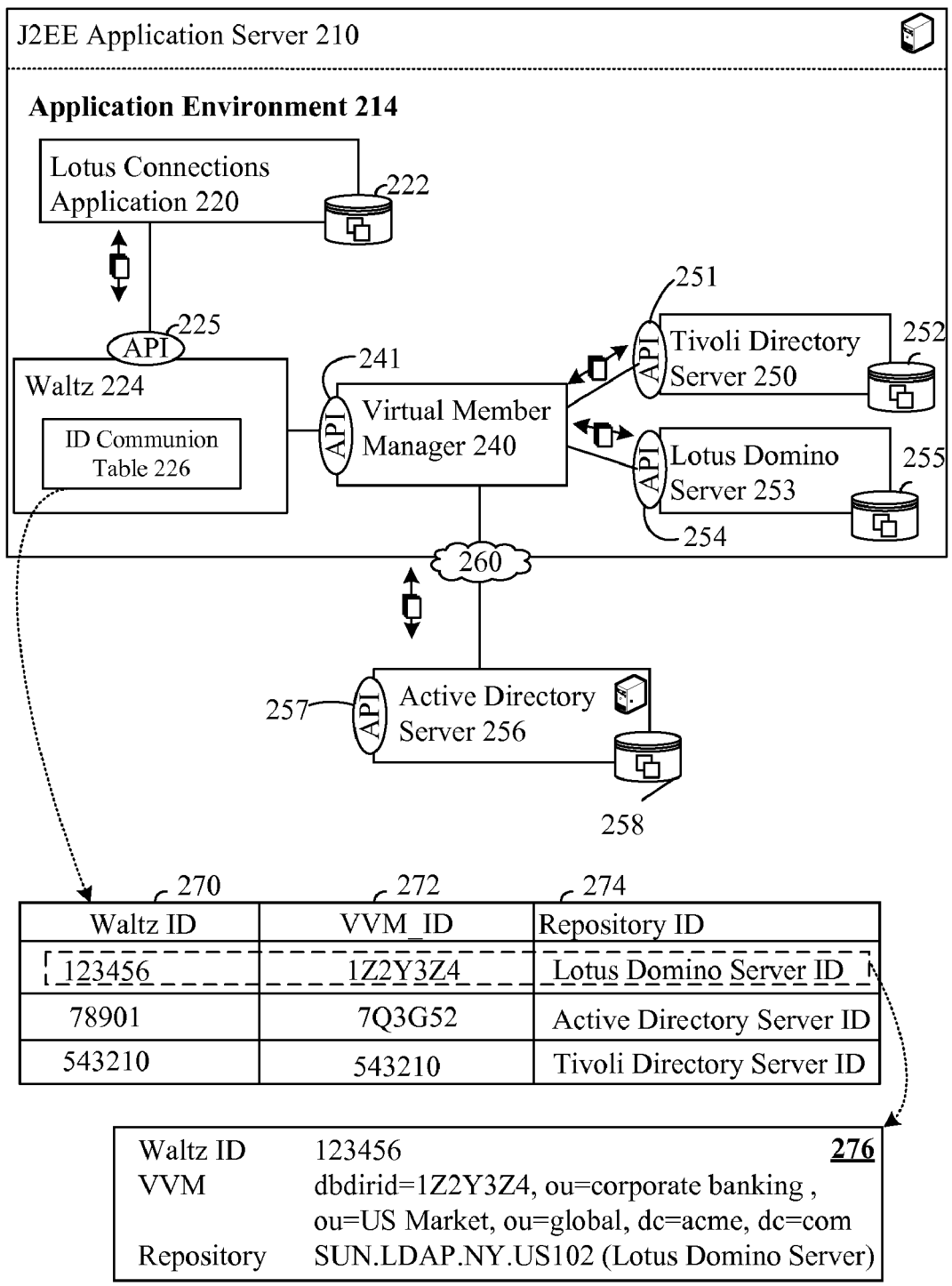
FIG. 2 is a schematic diagram illustrating an embodiment for handling heterogeneous directory service systems in accordance with an embodiment of the inventive arrangements disclosed herein.

FIG. 2 is a schematic diagram illustrating an embodiment 200 for handling heterogeneous directory service systems in accordance with an embodiment of the inventive arrangements disclosed herein. System 200 can represent a specific embodiment of system 100. System 200 includes a JAVA 2 ENTERPRISE EDITION (J2EE) server 210 having an application environment 214. The environment 214 can include multiple different hardware, software, and firmware components.

Within the environment, one or more LOTUS Connections applications 220 can run. When the application 220 loads, user specific contact information can be gathered and stored in data store 222 and used for the duration of an application 220 session. The gathering of contact information can request communications between application 220 and a unification point (Waltz 224), which can occur through API 225. The unification point (an enhanced implementation of Waltz 224/VMM 240 in one embodiment) can include an ID communion table 226. The LOTUS Connections application 220 can exclusively utilize unified object IDs (e.g., Waltz IDs, as shown by column 270).

Actual contact information can be maintained by a set of different directory servers, such as TIVOLI directory server 250, LOTUS DOMINO server 253, and active directory server 256. These servers 250, 253, 256 can, but need not, be hosted within the application environment 214 (note active directory server 256 is implemented outside environment 214 and is communicatively linked to unification point 224 via network 260). Each directory server 250, 253, 256 can have an API 251, 254, 257 and a server specific data store 252, 255, 258 with which contact information is maintained.

Application environment 214 shows a virtual member manager 240 of WEBSPHERE APPLICATION SERVER (WAS). The VMM 240 can be a federated user repository feature that simplifies access and maintenance of user data within multiple repositories. VMM 240 uses configuration parameters (instead of coding) to perform its functions. VMM 240 can be a federated user repository for servers 250, 253, and/or 256. Table 226 shows an ID unification table having a set of Waltz IDs 270 (unified object ID), VMM IDs 272, and repository IDs 274.

In embodiment 200, a single LDAP can be configured in a Federated Realm, where Waltz 224 (Directory Services of Connections) provides conversion routines for every single entry in need in between Waltz 224 and VMM 240. That is, a set of formulas can be used that maintain a relationship between the Waltz ID 270 (e.g., unified object ID) and the VMM ID 272 (e.g., directory object ID), where the formulas are specific to the Repository ID 274. Therefore, conversion formulas needed to convert to and from the Waltz ID 270 and VMM ID 272 are always available as needed. VMM 240 can return Waltz 224 with entries' ID (272) along with entries' repository ID (274). Therefore, Waltz 224 can maintain repository ID (274) information for each entry, as shown by table 226.

A challenge is that when Connections applications 220 rely on Waltz ID (270) to look up for entry's attribute value or group membership, the VMM ID (272) is needed (not Waltz ID) for Waltz 224 to invoke VMM API 241. All standard connections features would only give Waltz ID 270 in standard GUID format such as 924708C0-8F0A-1028-8560-DB07163B51B2. Waltz 224 must know the repository ID 274 to know whether this ID 270 need to be converted into different VMM format or not prior to invoking the VMM API 241 for a search. The ID communion mapping table 226 provides Waltz 224 all the information (Waltz ID 270, VMM ID 272, repository ID 274) to handle this need. Thus, the ID communion table 226 combined with the conversion formulas, results in a reliable bridge able to interface between application 220 and any of the directory servers 250, 253, 256. Without table 226, it can be impossible to work with multiple LDAPs (or other directory servers) simultaneously.

In one embodiment, Waltz 224 does not need to persist table 224 information for a significant time. Instead, the ID communion table 226 can be implemented in a very lightweight manner, where only the most frequently used entries can be included. Other embodiments exist, however, and the disclosure is not limited in this regard. In embodiment 200, Connections 220 can invoke Waltz 224 to determine user specific patterns. These patterns are assessed during login. That is, end-users login to Connections 220, which relies on WAS Security module to authenticate users. The WAS Security module brings back the principal name of an entry to Connections 220 features. Then, Waltz API 225 calls can be invoked to retrieve profiles and membership data. Once profiles and membership data is returned to Connections' applications 220, it is applications' responsibility to store acquired information into a local application database table in data store 222.

Embodiment 200 provides custom ID support. This negates a need to rely on the almost immutable ID value provided and maintained by an LDAP server. Users can, instead, create and maintain their own employee ID attribute and values via a set of dedicated IT personnel. This can be significant because many B2B and B2C interactions require use of a custom ID, which if not supported can impede business relationships among potential partnering companies.

Conventionally (without using the innovation of table 226), a system foundation cannot be leveraged and recognized to use a custom ID attribute. In embodiment 200, however, Waltz 224 can use table 224 to support custom ID. All the applications of Connections 220 do not need to handle complex mappings, but only need to invoke Waltz API 225 to gain access as if communications involved a single LDAP configuration. Waltz 224 can accept both system/directory ID and custom ID attribute value during search.

Diagram 276 shows that the table 226 can maintain any number of attributes per record. The attributes can be maintained in LDAP Data Interchange Format (LDIF), or in any other format depending upon implementation choices. Thus, the Waltz ID 270 can be given instead of a VMM ID, yet no other changes need be made to query based upon the attributes. Formulas, specific to repository IDs, can be invoked which convert requests back and forth (one type including a Waltz ID 270, another including a VMM ID 272), as needed.

Figure 3:
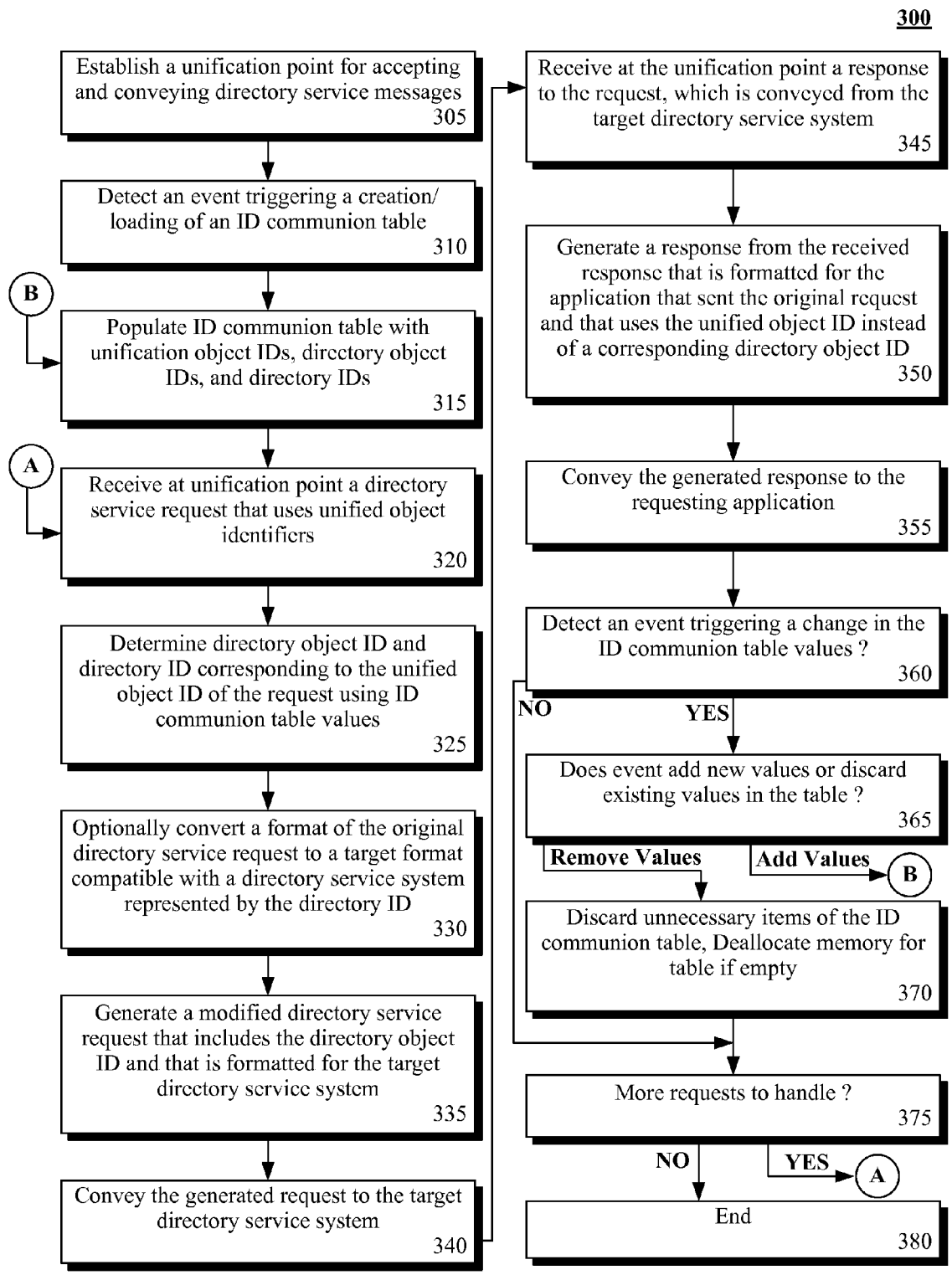
FIG. 3 is a flow chart of a method for unifying heterogeneous directory service systems using an ID communication table and unification point in accordance with an embodiment of the inventive arrangements disclosed herein.

FIG. 3 is a flow chart of a method 300 for unifying heterogeneous directory service systems using an ID communication table and unification point in accordance with an embodiment of the inventive arrangements disclosed herein.

Method 300 can begin in step 305, where a unification point can be established for accepting and conveying directory service messages. In step 310, an event triggering a creation/loading of an ID communion table can be detected. In one embodiment (i.e., the ID communion table being a very light weight table maintaining a set of most frequently used values in a volatile memory), a "load" event can one to populate the ID communion table with a needed value on demand. The event of step 310 can also be an event to update the ID communion table so that it only includes a most frequently used set of values based upon usage patterns, which vary over time. In another embodiment, when a software application (e.g., LOTUS CONNECTIONS) loads, this event (e.g., the event of step 310) can be triggered. The ID communion table need not be persisted in such a situation (step 370 discards table data, for example). In step 315, the ID communion table can be populated with appropriate values, such as unification object IDs, directory object IDs, and directory IDs, needed to respond to a set of one or more directory service requests.

In step 320, the unification point can receive a directory service request that utilizes unified object identifiers. In step 325, a directory object ID and directory ID corresponding to the unified object ID can be determined using the ID communion table. In optional step 330, a format of the original directory service request can be converted to a target format compatible with a directory service system having the directory ID. In step 335, a modified directory service request can be generated that includes the directory object ID and that is formatted for the target directory service system 335. In step 340, the generated request can be conveyed to the target directory service system, which processes this modified request.

In step 345, the target directory service system can send a respond to the unification point. In step 350, the unification point can create and generate a modified response that is formatted for the application that sent the original request. The modified response can use the unified object ID instead of a corresponding directory object ID. The modified response can be conveyed from the unification point to the requesting application, as shown by step 355.

In step 360, a triggering event may occur that changes values in the ID communion table. If such a change occurs (step 365), it can result in values being added or removed from the table. If values are to be added, the method can progress from step 365 to step 315, where the ID communion table can be populated with new values. For example, the ID communion table can concurrently support multiple different applications and users, and the ID communion table may need to be updated to support a new directory service request from a new user (i.e., in one embodiment, another user can instantiate LOTUS CONNECTIONS, which requires values for that user's contacts to be added to the ID communion table). When values are to be removed, unnecessary items can be discarded from the ID communion table, as shown by step 370. In one implementation, memory (e.g., RAM) can be optionally deallocated, such as deallocating all volatile memory when an ID communion table is empty and no longer needed. If more requests need to be handled, the method can proceed from step 375 to step 320. Otherwise, the method can end in step 380.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for applications to acquire directory service information from a heterogeneous set of directory service systems comprising:
   identifying a unification point comprising software executing on hardware having an API interface for accepting and conveying directory service messages;
   the unification point receiving a plurality of directory service information requests, wherein information corresponding to the requests is maintained in a plurality of different heterogeneous directory service systems, wherein each request comprises a unique identifier specific to the unification point, wherein the each of the plurality of heterogeneous directory service systems provide directory service access to information stored in a plurality of database systems;
   for each directory service request, the unification point querying an identification communion table to determine a unique identifier for a unique one of the heterogeneous directory service systems that maintains directory service information able to satisfy the directory service request;
   for each directory service request, the unification point generating a directory service request comprising the determined unique identifier and conveying the generated directory service request to the determined one of the heterogeneous directory service systems via an API specific to that directory service system;
   for each directory service request, the determined one of the heterogeneous directory service systems sending a data storage request to a determined one of the plurality of database systems;
   for each directory service request, the determined one of the plurality of database systems processing the data storage request;
   for each directory service request, the determined one of the heterogeneous directory service systems receiving a response from the determined plurality of database systems;
   for each directory service request, the unification point receiving a response from the determined one of the heterogeneous directory service systems via an API specific to that directory service system; and
   for each directory service request, the unification point generating a directory service response comprising the unique identifier specific to the unification point and conveying the generated directory service response to a requesting entity via the unification point API.

2. The method of claim 1, wherein the API interface of the unification point handles communications formatted in accordance with the standard, canonical GUID format, wherein at least one of the APIs specific to a heterogeneous directory service system does not handle communications formatted in accordance with the standard, canonical GUID format.

3. The method of claim 1, wherein the API interface of the unification point accepts requests and produces results in messages conforming to a Lightweight Directory Access Protocol (LDAP) standard, wherein at least one of the APIs specific to a heterogeneous directory service system does not accept requests conforming to the LDAP standard.

4. The method of claim 1, further comprising: the unification point converting a format of received directory service requests to a format of a directory service system, wherein at least a portion of the unification point generated directory service requests have been converted to the format of the directory service system.

5. The method of claim 1, further comprising:
   responsive a load time event of a software application, populating the identification communion table with values specific to a user of the software application;
   initializing an application session of the loaded software application for the user by handling a plurality of directory service requests, each submitted from the software application to the unification point, different ones of the directory services requests being directed by the unification point to different ones of the directory service systems;

storing results from the plurality of directory service requests in a data store region dedicated exclusively to the software application; and once the results are stored in the data store region, removing the values specific to the user from the identification communication table, wherein during execution the software application utilizes data in the data store region.

6. The method of claim 1, wherein requests issued to the unification point are handled from a requester perspective as if the unification point were a homogenous directory service system.

7. The method of claim 1, wherein the unification point lacks a federated data store and acquires all data used in responding to requests from data stores maintained by and for the heterogeneous directory service systems.

8. A computer program product for applications to acquire directory service information from a heterogeneous set of directory service systems comprising a physical non-transitory computer readable storage medium having computer usable program code embodied therewith, the computer usable program code comprising:

computer usable program code tangibly stored in a medium for identifying a unification point comprising software executing on hardware having an API interface for accepting and conveying directory service messages;

computer usable program code tangibly stored in a medium for receiving at a unification point a plurality of directory service information requests, wherein information corresponding to the requests is maintained in a plurality of different heterogeneous directory service systems, wherein each request comprises a unique identifier specific to the unification point, wherein the each of the plurality of heterogeneous directory service systems provide directory service access to information stored in a plurality of database systems;

computer usable program code tangibly stored in a medium for performing the following for each directory service request received by the unification point;

querying an identification communion table to determine a unique identifier for a unique one of the heterogeneous directory service systems that maintains directory service information able to satisfy the directory service request;

generating a directory service request comprising the determined unique identifier and conveying the generated directory service request to the determined one of the heterogeneous directory service systems via an API specific to that directory service system;

sending, via the determined one of the heterogeneous directory service systems, a data storage request to a determined one of the plurality of database systems for each directory service request;

processing, via the determined one of the plurality of database systems, the data storage request for each directory service request;

receiving, via the determined one of the heterogeneous directory service systems, a response from the determined plurality of database systems for each directory service request;

receiving a response from the determined one of the heterogeneous directory service systems via an API specific to that directory service system; and generating a directory service response comprising the unique identifier specific to the unification point and conveying the generated directory service response to a requesting entity via the unification point API.

9. The computer program product of claim 8, wherein the API interface of the unification point handles communications formatted in accordance with the standard, canonical GUID format, wherein at least one of the APIs specific to a heterogeneous directory service system does not handle communications formatted in accordance with the standard, canonical GUID format.

10. The computer program product of claim 8, wherein the API interface of the unification point accepts requests and produces results in messages conforming to a Lightweight Directory Access Protocol (LDAP) standard, wherein at least one of the APIs specific to a heterogeneous directory service system does not accept requests conforming to the LDAP standard.

11. The computer program product of claim 8, further comprising:

computer usable program code tangibly stored in a medium for converting at the unification point a format of received directory service requests to a format of a directory service system, wherein at least a portion of the unification point generated directory service requests have been converted to the format of the directory service system.

12. The computer program product of claim 8, further comprising:

computer usable program code tangibly stored in a medium for, responsive a load time event of a software application, populating the identification communion table with values specific to a user of the software application;

computer usable program code tangibly stored in a medium for initializing an application session of the loaded software application for the user by handling a plurality of directory service requests, each submitted from the software application to the unification point, different ones of the directory services requests being directed by the unification point to different ones of the directory service systems;

computer usable program code tangibly stored in a medium for storing results from the plurality of directory service requests in a data store region dedicated exclusively to the software application; and computer usable program code tangibly stored in a medium for, once the results are stored in the data store region, removing the values specific to the user from the identification communication table, wherein during execution the software application utilizes data in the data store region.

13. The computer program product of claim 8, wherein requests issued to the unification point are handled from a requester perspective as if the unification point were a homogenous directory service system.

14. The computer program product of claim 8, wherein the unification point lacks a federated data store and acquires all data used in responding to requests from data stores maintained by and for the heterogeneous directory service systems.

15. A system comprising:

one or more processors; and one or more memories storing computer usable program code, said program code executing on the one or more processors to:

identify a unification point comprising software executing on hardware having an API interface for accepting and conveying directory service messages;

receive, via the unification point, a plurality of directory service information requests, wherein information corresponding to the requests is maintained in a plurality of different heterogeneous directory service systems, wherein each request comprises a unique identifier specific to the unification point, wherein the each of the plurality of heterogeneous directory service systems provide directory service access to information stored in a plurality of database systems;

query, via the unification point, an identification communion table to determine a unique identifier for a unique one of the heterogeneous directory service systems that maintains directory service information able to satisfy the directory service request for each directory service request;

generate, via the unification point, a directory service request comprising the determined unique identifier and conveying the generated directory service request to the determined one of the heterogeneous directory service systems via an API specific to that directory service system for each directory service request;

send, via the determined one of the heterogeneous directory service systems, a data storage request to a determined one of the plurality of database systems for each directory service request;

process, via the determined one of the plurality of database systems, the data storage request for each directory service request;

receive, via the determined one of the heterogeneous directory service systems, a response from the determined plurality of database systems for each directory service request;

receive, via the unification point, a response from the determined one of the heterogeneous directory service systems via an API specific to that directory service system for each directory service request; and generate, via the unification point, a directory service response comprising the unique identifier specific to the unification point and conveying the generated directory service response to a requesting entity via the unification point API for each directory service request.

16. The system of claim 15, wherein the API interface of the unification point handles communications formatted in accordance with the standard, canonical GUID format, wherein at least one of the APIs specific to a heterogeneous directory service system does not handle communications formatted in accordance with the standard, canonical GUID format.

17. The system of claim 15, wherein the API interface of the unification point accepts requests and produces results in messages conforming to a Lightweight Directory Access Protocol (LDAP) standard, wherein at least one of the APIs specific to a heterogeneous directory service system does not accept requests conforming to the LDAP standard.

18. The system of claim 15, wherein requests issued to the unification point are handled from a requester perspective as if the unification point were a homogenous directory service system.

19. The system of claim 15, wherein the unification point lacks a federated data store and acquires all data used in responding to requests from data stores maintained by and for the heterogeneous directory service systems.

* * * * *